(12) United States Patent
Liang et al.

(10) Patent No.: US 10,795,072 B2
(45) Date of Patent: Oct. 6, 2020

(54) OPTICAL CHAMBER, OPTICAL SYSTEM AND DISPLAY DEVICE

(71) Applicants: BEIJING BOE OPTOELECTRONICS TECHNOLOGY CO., LTD, Beijing (CN); BOE TECHNOLOGY GROUP CO., LTD, Beijing (CN)

(72) Inventors: Fei Liang, Beijing (CN); Lingyu Sun, Beijing (CN); Xiuyun Chen, Beijing (CN); Jingjun Du, Beijing (CN)

(73) Assignees: BEIJING BOE OPTOELECTRONICS TECHNOLOGY CO., LTD, Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 16/335,869

(22) PCT Filed: Sep. 4, 2018

(86) PCT No.: PCT/CN2018/104017
§ 371 (c)(1),
(2) Date: Mar. 22, 2019

(87) PCT Pub. No.: WO2019/140923
PCT Pub. Date: Jul. 25, 2019

(65) Prior Publication Data
US 2020/0064534 A1 Feb. 27, 2020

(30) Foreign Application Priority Data

Jan. 17, 2018 (CN) .......................... 2018 1 0043445

(51) Int. Cl.
*F21V 8/00* (2006.01)

(52) U.S. Cl.
CPC .......... *G02B 6/0031* (2013.01); *G02B 6/003* (2013.01); *G02B 6/0076* (2013.01)

(58) Field of Classification Search
CPC .... G02B 6/0031; G02B 6/003; G02B 6/0076; G02B 27/0961; G02B 27/0977
See application file for complete search history.

(56) References Cited

U.S. PATENT DOCUMENTS

| 6,547,400 B1 | 4/2003 | Yokoyama |
| 2008/0285984 A1 | 11/2008 | Hughes |

(Continued)

FOREIGN PATENT DOCUMENTS

| CN | 1570719 A | 1/2005 |
| CN | 101061412 A | 10/2007 |

(Continued)

OTHER PUBLICATIONS

Chinese Office Action for counterpart 201810043445.6 dated Apr. 22, 2019.

(Continued)

*Primary Examiner* — Kevin Quarterman
(74) *Attorney, Agent, or Firm* — Arent Fox LLP; Michael Fainberg

(57) ABSTRACT

An optical chamber, an optical system, and a display device are provided. The optical chamber includes: a plurality of sidewalls, including a first sidewall having at least one opening, configured to reflect light in the optical chamber; and a light path adjusting element connected with the first sidewall, wherein the orthographic projection of the light path adjusting element onto the plane where the first sidewall lies at least partially lies in the area where the opening is located, and the light path adjusting element is configured to uniformly emit the light reflected by the plurality of sidewalls to the outside.

12 Claims, 8 Drawing Sheets

(56) References Cited

U.S. PATENT DOCUMENTS

2012/0294037 A1* 11/2012 Holman .................. F21V 5/02
                                                     362/609
2013/0322114 A1* 12/2013 Nishitani ............. G02B 6/0051
                                                     362/606
2014/0140044 A1     5/2014 Wang

FOREIGN PATENT DOCUMENTS

| CN | 201487710 A   |   | 5/2010 |
|----|---------------|---|--------|
| CN | 102182968 A   |   | 9/2011 |
| CN | 203178513 A   |   | 9/2013 |
| CN | 203517528 U   |   | 4/2014 |
| CN | 104456290 A   | * | 3/2015 |
| CN | 104456290 A   |   | 3/2015 |
| CN | 207516699 A   |   | 6/2018 |
| CN | 108279505 A   |   | 7/2018 |
| JP | 2007227060 A  |   | 9/2007 |

OTHER PUBLICATIONS

International Search Report for PCT/CN2018/104017 dated Nov. 30, 2018.

* cited by examiner

OPTICAL CHAMBER, OPTICAL SYSTEM AND DISPLAY DEVICE

CROSS-REFERENCES TO RELATED APPLICATIONS

This disclosure is a U.S. National Stage of International Application No. PCT/CN2018/104017, filed Sep. 4, 2018 which claims priority to Chinese Patent Application No. 201810043445.6, filed with the Chinese Patent Office on Jan. 17, 2018, and entitled "Optical chamber, optical system, and display device", which is hereby incorporated by reference in its entirety.

FIELD

This disclosure relates to the field of display technologies, and particularly to an optical chamber, an optical system, and a display device.

BACKGROUND

With the development of the display technologies, various display devices including a liquid crystal display device, a plasma display device, an organic light-emitting display device, an electrophoresis display device, etc., have been widely applied in many fields gradually. However there is such a limiting condition, e.g., a limited light emission angle, etc., of light sources in the display devices that a phenomenon of non-uniform brightness, i.e., the hotspot may occur on a light-guiding plate.

SUMMARY

An embodiment of this disclosure provides an optical chamber. The optical chamber includes: a plurality of sidewalls, including a first sidewall having at least one opening, the plurality of sidewalls being configured to reflect light in the optical chamber; and a light path adjusting element connected with the first sidewall, the light path adjusting element has an orthographic projection onto a plane where the first sidewall lies, the orthographic projection at least partially lies in an area of the opening, and the light path adjusting element is configured to uniformly emit the light reflected by the plurality of sidewalls to outside.

In a possible implementation, in the optical chamber above according to the embodiment of this disclosure, there is an angle between the light path adjusting element and the first sidewall, and the angle is not equal to 0.

In a possible implementation, in the optical chamber above according to the embodiment of this disclosure, the optical chamber further includes: a bent section, the bent section has an orthographic projection onto the plane where the first sidewall lies, the orthographic projection lies in the area of the opening, the bent section is connected respectively with the first sidewall and the light path adjusting element, and a V-shaped groove is defined by the bent section and the light path adjusting element relative to the plane where the first sidewall lies.

In a possible implementation, in the optical chamber above according to the embodiment of this disclosure, a diffuse reflection structure is on inner surfaces of the plurality of sidewalls and the bent section.

In a possible implementation, in the optical chamber above according to the embodiment of this disclosure, the light path adjusting element includes a compound lens with a refractive index ranging from 1.41 to 1.8.

In a possible implementation, in the optical chamber above according to the embodiment of this disclosure, the plurality of sidewalls further includes a second sidewall and a third sidewall opposite to each other, wherein the first sidewall abuts respectively onto the second sidewall and the third sidewall; and the second sidewall includes a body section and an extension section, wherein the extension section and the body section are respectively on two sides of the plane where the first sidewall lies.

In a possible implementation, in the optical chamber above according to the embodiment of this disclosure, the first sidewall is provided with one opening; a protruding block is on a side of the opening away from the second sidewall, and the protruding block is connected with the first sidewall and faces the extension section.

An embodiment of this disclosure further provides an optical system. The optical system includes: a light source and the optical chamber above. The light source is inside the optical chamber.

In a possible implementation, in the optical system above according to the embodiment of this disclosure, the light source is on an inner surface of any one of the other sidewalls among the plurality of sidewalls than the first sidewall.

An embodiment of this disclosure further provides a display device. The display device includes: a display module and the optical system above. The optical system is on at least one side surface of the display module, and configured to enable emitted light to be irradiated onto a light incidence surface of the display module.

In a possible implementation, in the display device above according to the embodiment of this disclosure, an extension section of the optical system adheres to a surface of the light-guiding plate away from the display surface side, and the light path adjusting element of the optical system is configured to face a side surface of the light-guiding plate.

In a possible implementation, in the display device above according to the embodiment of this disclosure, a protruding block of the optical system adheres to a surface of the light-guiding plate away from the display surface side.

In a possible implementation, in the display device above according to the embodiment of this disclosure, the display module includes two light-guiding plates and a display panel, wherein the display panel is a transflective display panel; the two light-guiding plates are respectively on a display surface side of the display panel and a side of the display away from the display surface side; and the first sidewall of the optical system has two openings, wherein the light path adjusting elements, corresponding to the areas of the two openings, are configured respectively to face side surfaces of the two light-guiding plates.

DETAILED DESCRIPTION

Figure 1:
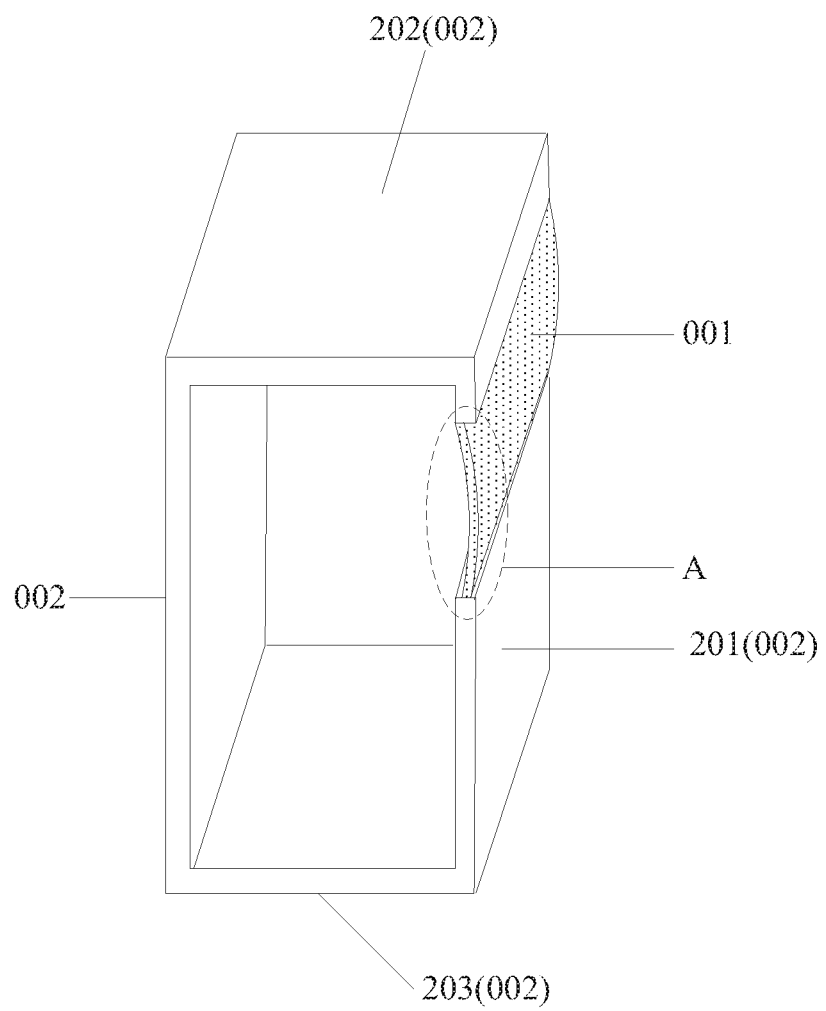
FIG. 1 to FIG. 5 are schematic structural diagrams of an optical chamber according to some embodiments of this disclosure in sectional views.

Implementations of the optical chamber, the optical system, and the display device according to the embodiments of this disclosure will be described below in details with reference to the drawings. It shall be noted that the embodiments to be described in this specification are only a part but not all of the embodiments of this disclosure, and the embodiments of this disclosure, and the features in the embodiments can be combined with each other unless they conflict with each other, and moreover based upon the embodiments here of this disclosure, all the other embodiments which can occur to those ordinarily skilled in the art without any inventive effort shall fall into the claimed scope of this disclosure.

The shapes and the sizes of respective layers in the drawings are not intended to reflect any real proportions of the optical chamber, the optical system, and the display device, but only intended to illustrate this disclosure.

An embodiment of this disclosure provides an optical chamber. As illustrated in FIG. 1 to FIG. 5, the optical chamber includes: a light path adjusting element 001 and a plurality of sidewalls 002.

The plurality of sidewalls 002 includes a first sidewall 201 having at least one opening A, and the plurality of sidewalls are configured to reflect light in the optical chamber.

The light path adjusting element 001 is connected with the first sidewall 201, and the light path adjusting element 001 has an orthographic projection onto the plane where the first sidewall 201, the orthographic projection lies at least partially lies in the area of the opening A, and the light path adjusting element 001 is configured to uniformly emit the light reflected by the plurality of sidewalls 002 to the outside.

Figure 2:
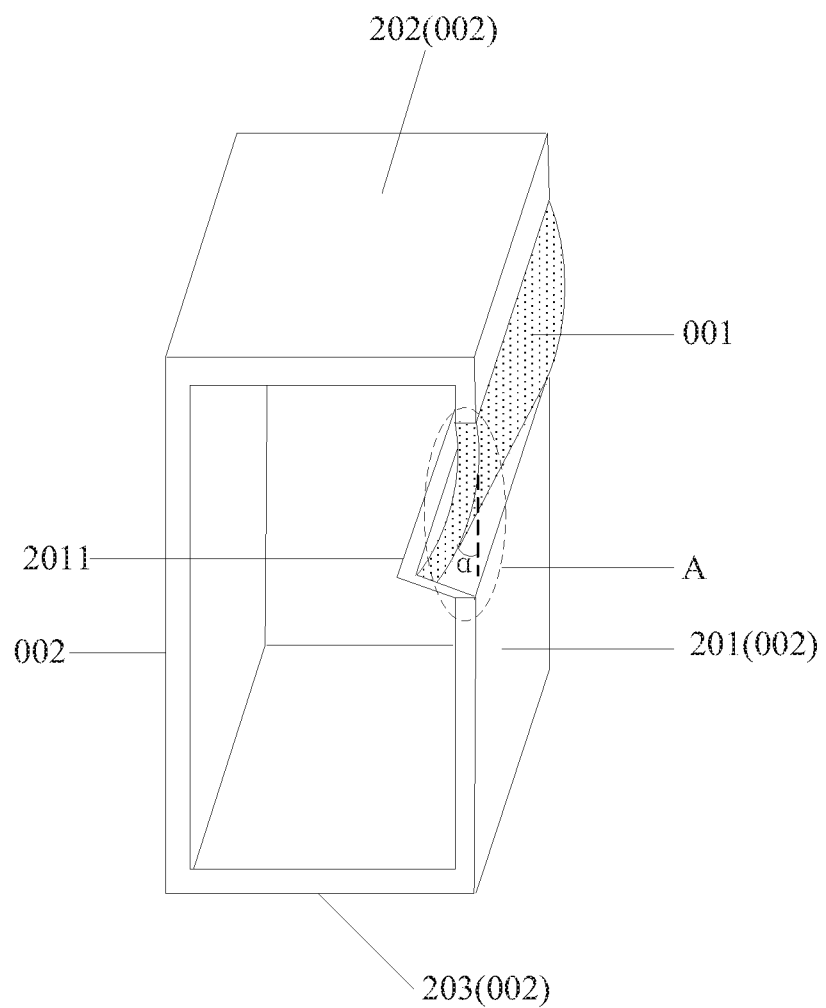
Figure 3:
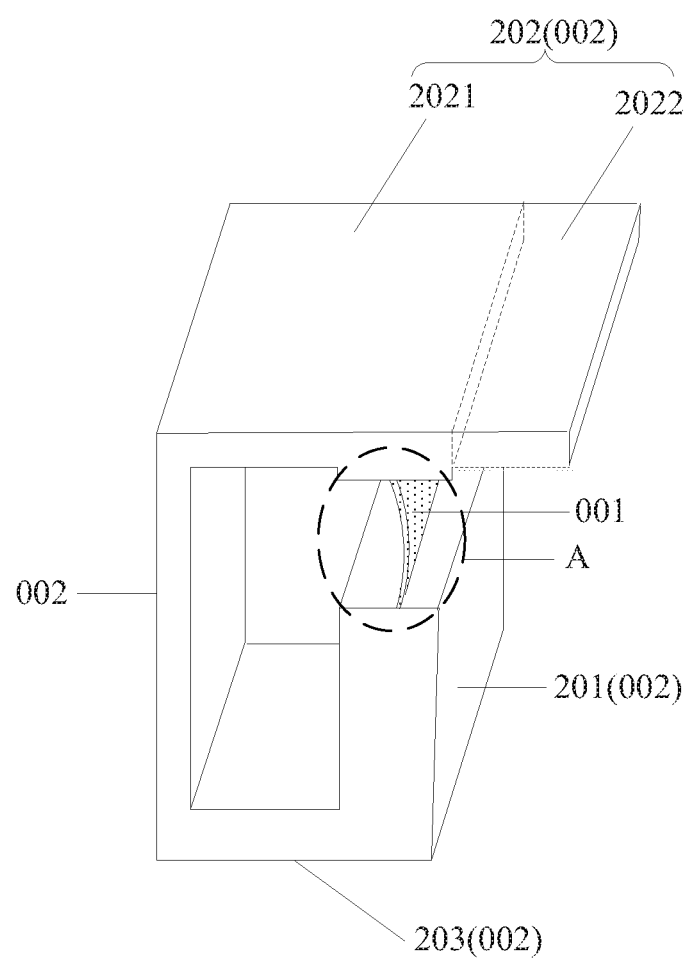
Figure 4:
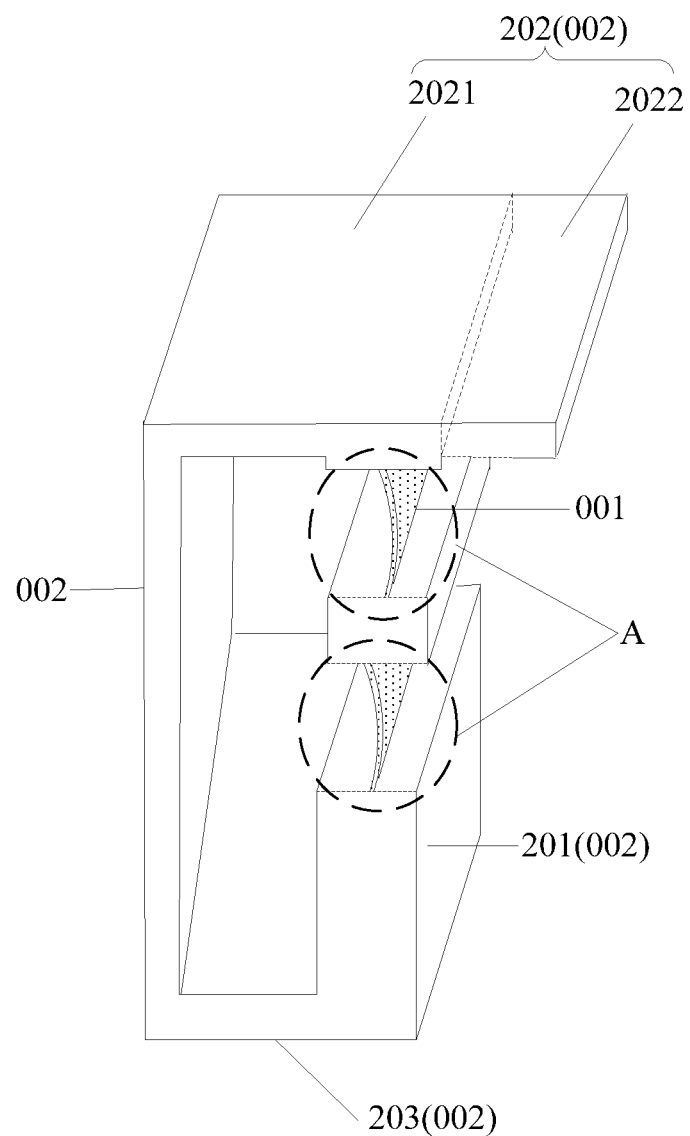

Specifically in the optical chamber above according to the embodiment of this disclosure, as illustrated in FIG. 1 to FIG. 3, and FIG. 5, one opening A can be on the first sidewall 201, and the light path adjusting element 001 is fixed in the opening A through embedding, adhering, engaging, etc.; as illustrated in FIG. 4, two openings A can be on the first sidewall 201, and the light path adjusting element 001 is fixed respectively in the two openings A through embedding, adhering, engaging, etc. Furthermore the area of the orthographic projection of the light path adjusting element 001 onto the plane where the first sidewall 201 lies can be more than or equal to or less than the area(s) of the opening(s) on the first sidewall.

Specifically in the optical chamber above according to the embodiment of this disclosure, a hollow part of the optical chamber is surrounded by the inner surfaces of the plurality of sidewalls 002, the light in the optical chamber is reflected by the inner surfaces of the plurality of sidewalls 002, and finally the light path adjusting element 001 uniformly emits the light reflected by the inner surfaces of the plurality of sidewalls 002 to the outside.

Specifically in the optical chamber above according to the embodiment of this disclosure, since the light can be reflected by the inner surfaces of the plurality of sidewalls 002 of the optical chamber to the light path adjusting element 001, and the light path adjusting element 001 uniformly emit the light When a light source provide incident light to the optical chamber in a real application, the optical chamber can uniformly emit the incident light provided by the light source to the outside, to thereby provide a light-guiding plate with the uniform light so as to eliminate the hotspot phenomenon on the light-guiding plate.

It shall be noted that the optical chamber above according to the embodiment of this disclosure can be cube, cuboid, or cylinder, and the specific shape thereof can be set as needed in reality, although the embodiment of this disclosure will not be limited thereto. Furthermore in order to make the technical solution according to the embodiment of this disclosure more apparent, the optical chamber in the cuboid form defined by six side faces will be described below by way of an example.

In an implementation, in order to better guide and uniformly emit the light reflected on the inner surfaces of the plurality of sidewalls 002 to the outside, optionally in the optical chamber above according to the embodiment of this disclosure, there may be an angle $\alpha$ ($\alpha$ is not equal to 0) between the light path adjusting element 001 and the plane where the first sidewall 201 lies as illustrated in FIG. 2.

Specifically when the optical chamber cooperates with a reflective display module, the size of the angle $\alpha$ depends upon the size of the optical chamber, the height of the light path adjusting element 001 above the upper surface of a light-guiding plate in the reflective display module, and a reflecting layer of a display panel in the reflective display module, although the embodiment of this disclosure will not be limited thereto.

Optionally in the optical chamber above according to the embodiment of this disclosure, there may be a number of implementations of the a between the light path adjusting element 001 and the first sidewall 201, and as illustrated in FIG. 2, for example, a bent section 2011 connected respectively with the first sidewall 201 and the light path adjusting element 001 can be arranged, where the bent section 2011 has an orthographic projection onto the plane where the first sidewall 201 lies, the orthographic projection lies in the area of the opening A, and also a V-shaped groove is defined by the bent section 2011 and the light path adjusting element 001 relative to the plane where the first sidewall 201 lies. Of course, there may be other implementations of the angle $\alpha$ in a specific implementation, although the embodiment of this disclosure will not be limited thereto.

Specifically the bent section 2011 can be made of the same material as the first sidewall 201, and the bent section 2011 and the first sidewall 201 can be fabricated in one molding process; or the bent section 2011 and the first sidewall 2011 can be fabricated respectively in different processes, and then connected with each other through engaging, adhering, etc., although the embodiment of this disclosure will not be limited thereto.

Specifically since the surface of an object is generally rough, light may be diffusively reflected on the surface thereof, so in order to enhance diffuse reflection to thereby mix incident light sufficiently, optionally in the optical chamber above according to the embodiment of this disclosure, a diffuse reflection structure can be on the inner surfaces of the plurality of sidewalls 002 and the bent section 2011 (not illustrated throughout FIG. 1 to FIG. 5).

Specifically the diffuse reflection structure can be a diffuse reflection film or a diffuse reflection coating. The diffuse reflection film can be formed by coating a white diffuse reflection material on the inner surfaces of the plurality of sidewalls 002, and the inner surface of the bent section 2011. Alternatively in a specific implementation, the optical chamber can be fabricated by arranging a reflection film on the inner surfaces of the plurality of sidewalls 002 and the bent section 2011, or can be made of a material capable of reflecting light as long as the inner surfaces of the plurality of sidewalls 002 and the bent section 2011 reflects light.

Optionally in order to improve the exit ratio of the reflected light, in the optical chamber above according to the embodiment of this disclosure, the light path adjusting element 001 can be a compound lens. Specifically the material of the compound lens can be glass, polymethyl methacrylate (PMMA), Polycarbonate (PC), or another transparent material; and the refractive index of the compound lens ranges from 1.41 to 1.8, and generally the higher refractive index of the compound lens is better.

Figure 5:
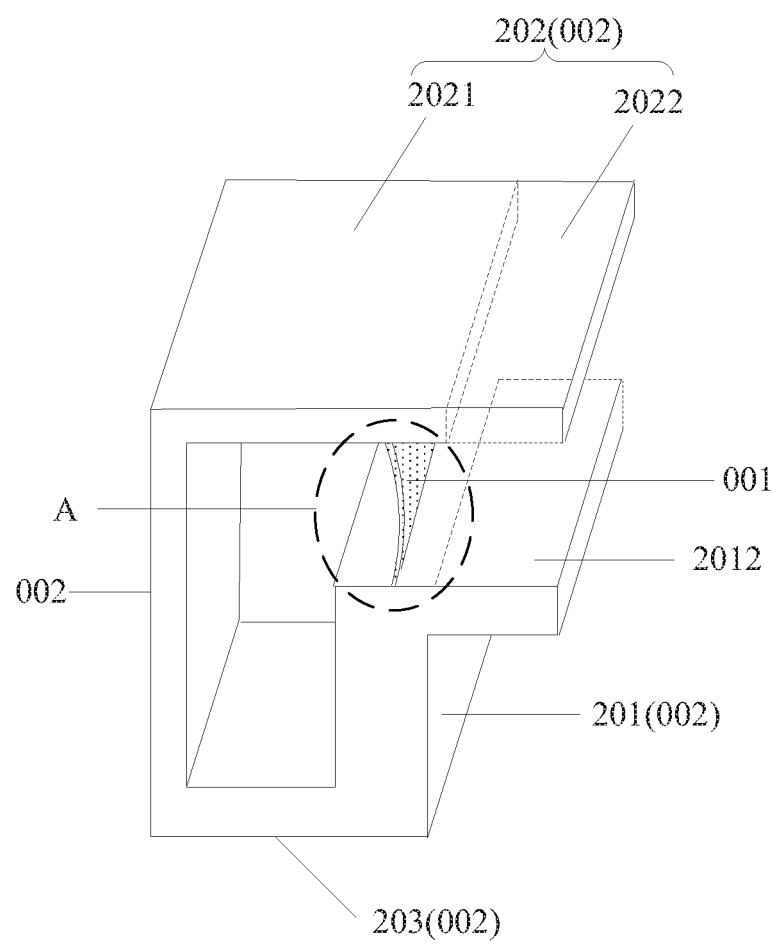

Specifically taking a real application scenario into account, for example, in order to enable the optical chamber cooperating with the display module to be fixed in position relative thereto, optionally in the optical chamber above according to the embodiment of this disclosure, as illustrated in FIG. 3 to FIG. 5, the plurality of sidewalls 002 can further include a second sidewall 202 and a third sidewall 203 opposite to each other.

The first sidewall 201 abuts respectively onto the second sidewall 202 and the third sidewall 203.

The second sidewall 202 includes a body section 2021 and an extension section 2022, where the extension section 2022 and the body section 2021 are located respectively on two sides of the plane where the first sidewall 201 lies.

With the arrangement above, when the optical chamber cooperates with the display module, or in another application scenario, the optical chamber can be engaged with the display module through the extension section 202 so that the optical chamber can be fixed in position relative to the display module.

Specifically in the optical chamber above according to the embodiment of this disclosure, as illustrated in FIG. 5, the first sidewall 201 is provided with one opening A, for example, where a protruding block 2012 is on a side of the opening A away from the second sidewall 202, and the protruding block 2012 is connected with the first sidewall 201, and faces the extension section 2022. In this way, the optical chamber can be engaged with the display module through the protruding block 2012, and in this way, the light path adjusting element 001 is positioned above the light incidence surface of the reflective display module, so that the light emitted from the optical chamber can be irradiated in effect onto the light incidence surface of the reflective display module.

Figure 6:
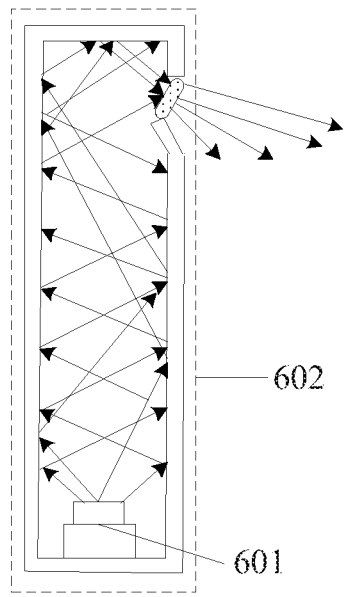
FIG. 6 and FIG. 7 are front views of an optical system according to some embodiments of this disclosure.
Figure 7:
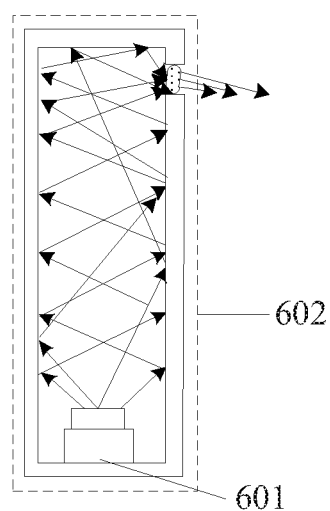

Based upon the same inventive idea, an embodiment of this disclosure provides an optical system as illustrated in FIG. 6 and FIG. 7, which includes a light source 601 and the optical chamber 602, where the light source 601 is inside the optical chamber 602, and configured to enable the light to be incident into the optical chamber 602.

Since the optical system addresses the problem under a similar principle to the optical chamber above, reference can be made to the implementation of the optical chamber according to the embodiment of this disclosure for an implementation of the optical system according to the embodiment of this disclosure, and a repeated description thereof will be omitted here.

Optionally in the optical system above according to the embodiment of this disclosure, the light source 601 can be flexibly in a number of positions as a component providing the incident light to the optical chamber 602. For example, the light source 601 can be located on the inner surface of any one of the plurality of sidewalls 002 of the optical chamber 602.

Specifically in order to enable the incident light provided by the light source 601 to be reflected repeatedly to thereby be preliminarily mixed, and then uniformly exiting the light path adjusting element 001, the light source 601 can be on the inner surface of any one of the other sidewalls among the plurality of sidewalls 002 of the optical chamber 601 than the first sidewall 201, and for example, the light source 601 is on the inner surface of the bottom sidewall as illustrated in FIG. 6 and FIG. 7.

Specifically only the optical system including the optical chamber of FIG. 1 and FIG. 2 and the light source is illustrated respectively in FIG. 6 and FIG. 7 according to the embodiment of this disclosure. In an implementation, the optical system can alternatively include the optical chamber as illustrated in FIG. 3 to FIG. 5 and the light source, and the light source can be in the optical chamber of FIG. 3 to FIG. 5 at a different position from the position thereof in the optical chamber of FIG. 1 and FIG. 2.

Moreover the light source 601 can be a light-emitting diode LED, an infrared light source, or a laser light source, and the type of the light source 601 can be selected specifically as needed in a real application scenario, although the embodiment of this disclosure will not be limited thereto.

Based upon the same inventive idea, an embodiment of this disclosure further provide a display device as illustrated in FIG. 8 to FIG. 11, which includes a display module 901 and the optical system 902 above, where the optical system 902 is located on at least one side surface of the display module 901, and the optical system 902 is configured to enable the emitted light to be irradiated onto the light incidence surface of the display module 901. The display device as illustrated in FIG. 8 to FIG. 11 will be described by way of an example in which the optical system 902 is on the left side of the display module 901.

Specifically the display device can be a mobile phone, a tablet computer, a TV set, a monitor, a notebook computer, a digital camera, a navigator, a smart watch, a fitness wrist band, a personal digital assistant, an automatic teller machine, or any other product or component with a display function. All the other components indispensable to the display device shall readily occur to those ordinarily skilled in the art, and a repeated description thereof will be omitted here, although the embodiment of this disclosure will not be limited thereto.

Figure 8:
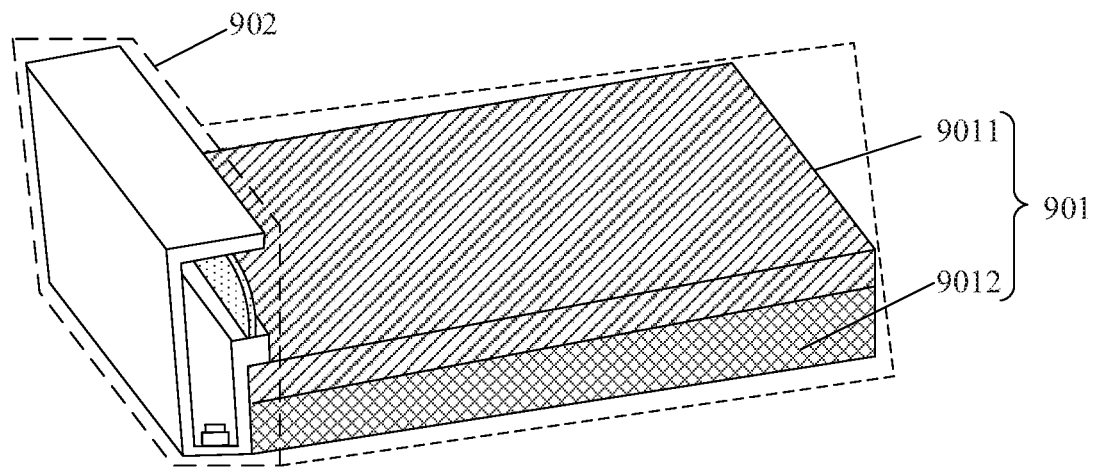
FIG. 8 is a schematic structural diagram of a display device according to an embodiment of this disclosure in a sectional view.
Figure 9:
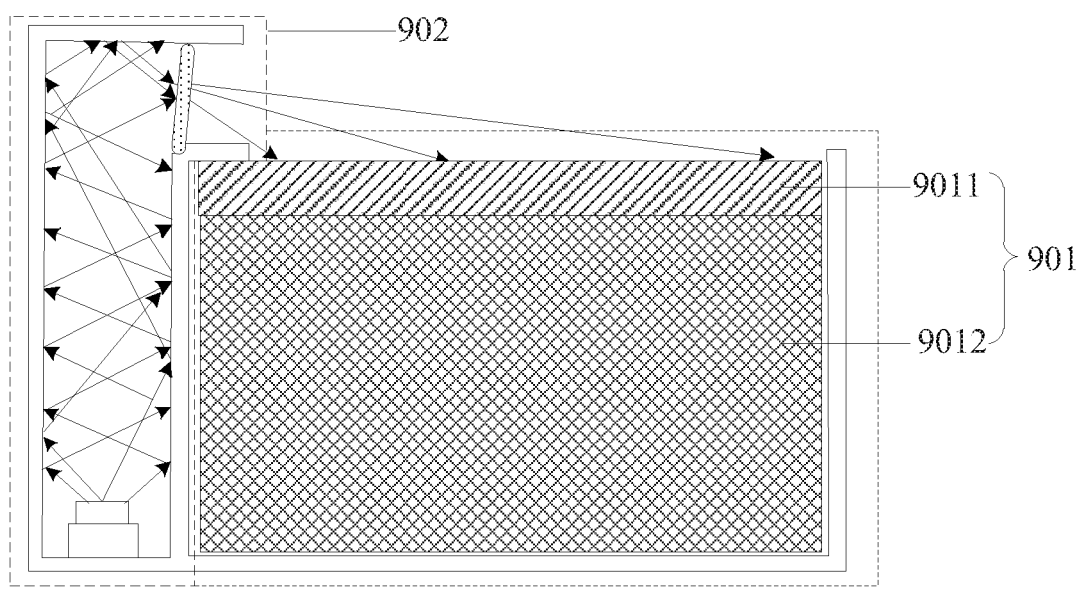
FIG. 9 is a front view of the display device as illustrated in FIG. 8.
Figure 10:
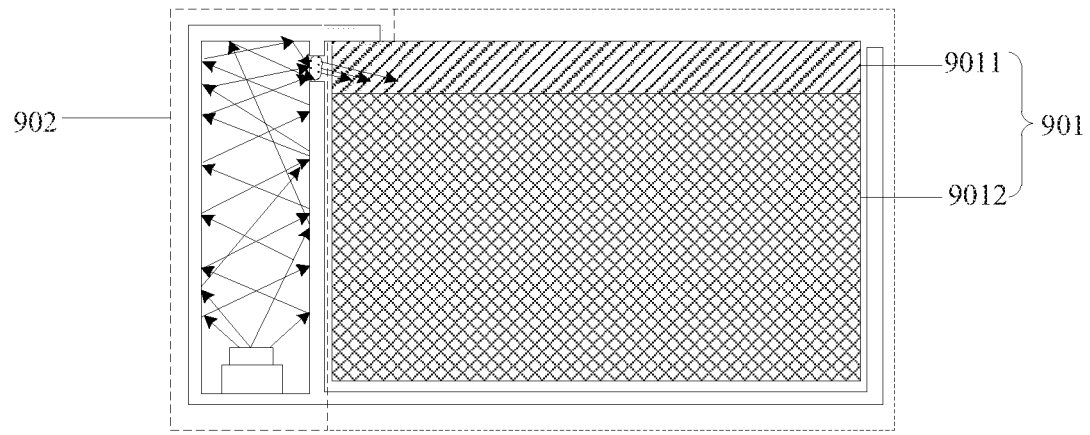
FIG. 10 is another schematic structural diagram of a display device according to the embodiment of this disclosure in a sectional view.

Optionally in order to enable the optical system 902 to better provide the uniform light to a light-guiding plate 9011 of the display module 901, in the display device above according to the embodiment of this disclosure, as illustrated in FIG. 8 to FIG. 10, the display module 901 includes a light-guiding plate 9011 and a display panel 9012, where the display panel 9012 is a reflective display panel, and the light-guiding plate 9011 is located on a display surface side of the display panel 9012.

Specifically in the display device above according to the embodiment of this disclosure, when the display panel 9012 is a reflective display panel, the display panel can include an array substrate, and a reflecting layer, a liquid crystal layer, a color filter substrate, a scattering film, a quarter-wave plate (QW), a half-wave plate (HW), and a polarizer (POL), successively on the array substrate. The light-guiding plate 9011 is located on the side of the polarizer (POL) away from the array substrate.

Optionally in the display device above according to the embodiment of this disclosure, as illustrated in FIG. 8 and FIG. 9, when the display panel 9012 is a reflective display panel, the protruding block of the optical system 902 can adhere to the surface of the light-guiding plate 9011 away from the display surface side, thus providing the display device with a stable structure.

Specifically in order not to hinder an image from being displayed normally, the protruding block of the optical system 902 can adhere to a bezel area on the surface of the light-guiding plate 9011 away from the display surface side. In this way, the opening of the optical system 902 can be above the plane where the light-guiding plate 9011 lies, in the direction perpendicular to the plane where the reflective display panel lies, and extending in the light exit direction of the display device, so that the light emitted from the optical system 902 can be irradiated uniformly onto the light-guiding plate 9011, thus eliminating the hotspot phenomenon on the light-guiding plate 9011.

Optionally in the display device above according to the embodiment of this disclosure, as illustrated in FIG. 10, when the display panel 9012 is a reflective display panel, the extension section of the optical system 902 can adhere to the surface of the light-guiding plate 9011 away from the display surface side, thus providing the display device with a stable structure; and the light path adjusting element 001 of the optical system 902 is configured to face the side surface of the light-guiding plate 9011.

Specifically in order not to hinder an image from being displayed normally, the extension section of the optical system 902 can adhere to a bezel area on the surface of the light-guiding plate 9011 away from the display surface side. In this way, the light emitted from the optical system 902 can be irradiated uniformly onto the side surface of the light-guiding plate 9011, thus eliminating the hotspot on the light-guiding plate 9011.

Figure 11:
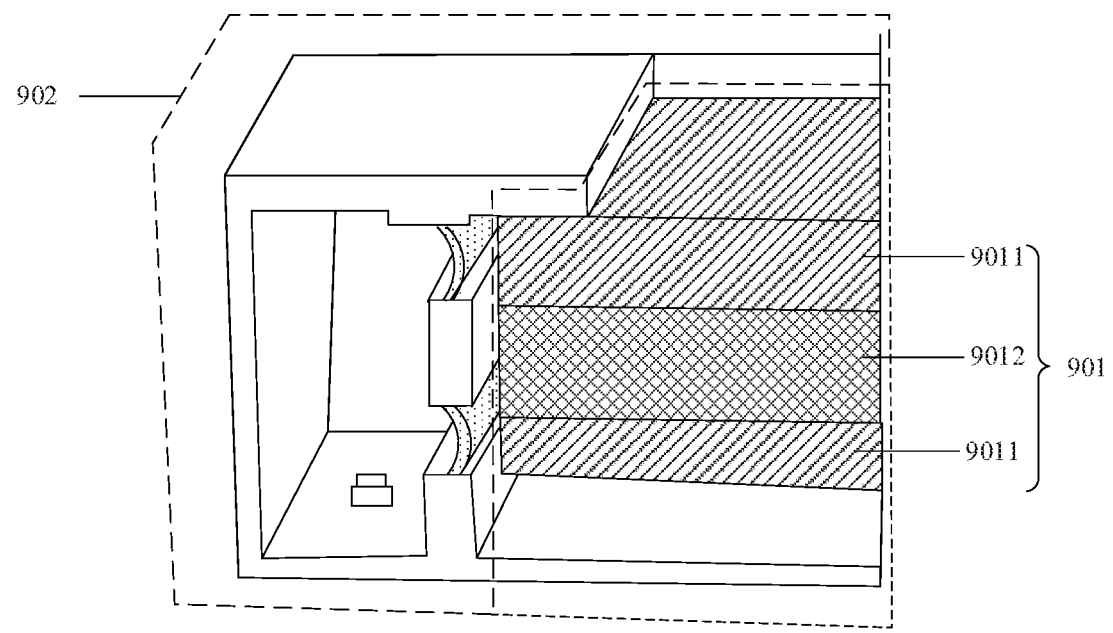
FIG. 11 is another schematic structural diagram of a display device according to the embodiment of this disclosure in a sectional view.

Specifically in the display device above according to the embodiment of this disclosure, as illustrated in FIG. 11, the display panel 9012 can alternatively be a transflective display panel, and the display module 901 includes two light-guiding plates 9011 located respectively on the display surface side of the display panel 9012, and a side of the display panel 9012 away from the display surface side thereof; and the first sidewall 201 of the optical system 902 has two openings A, where the light path adjusting elements 001, corresponding to the two areas where the two openings A are located, are configured respectively to face the side surfaces of the two light-guiding plates 9011.

In this way, the light emitted from the optical system 902 can be irradiated uniformly onto the light-guiding plates 9011, thus eliminating the hotspot phenomenon on the light-guiding plates 9011. Furthermore there are two openings so that the optical system 902 can operate concurrently in reflective and transmittive operating modes when the intensity of ambient light is low, thus improving the utilization ratio of the light uniformly emitted from the optical system.

The optical chamber, the optical system, and the display device above according to the embodiments of this disclosure include: a light path adjusting element and a plurality of sidewalls, where the plurality of sidewalls includes a first sidewall, and at least one opening is on the first sidewall; the light path adjusting element is connected with the first sidewall, and the orthographic projection of the light path adjusting element onto the plane where the first sidewall lies is at least partially lies in the area where the opening is located; and the plurality of sidewalls are configured to reflect light in the optical chamber, and the light path adjusting element is configured to uniformly emit the light reflected by the plurality of sidewalls. The light in the optical chamber can be reflected by the plurality of sidewalls to the light path adjusting element, and uniformly exit from the light path adjusting element, so when the light source provides the optical chamber with incident in a real application, the optical chamber can uniformly emit the light provided by the light source to the outside to thereby provide the light-guiding plate with the uniform light so as to eliminate in effect the hotspot phenomenon on the light-guiding plate.

It shall be noted that in this context, the relationship terms, e.g., "first", "second", etc., are only intended to distinguish one entity or operation from another entity or operation, but not intended to require or suggest any such a real relationship or order between these entities or operations.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An optical chamber, comprising:
   a plurality of sidewalls, comprising a first sidewall having at least one opening, the plurality of sidewalls being configured to reflect light in the optical chamber; and
   a light path adjusting element connected with the first sidewall, the light path adjusting element has an orthographic projection onto a plane where the first sidewall lies, the orthographic projection at least partially lies in an area of the opening, and the light path adjusting element is configured to uniformly emit the light reflected by the plurality of sidewalls to outside;
   wherein there is an angle between the light path adjusting element and the plane where the first sidewall lies, and the angle is not equal to 0;
   wherein the optical chamber further comprises a bent section, wherein the bent section has an orthographic projection onto the plane where the first sidewall lies, the orthographic projection lies in the area of the opening, the bent section is connected respectively with the first sidewall and the light path adjusting element, and a V-shaped groove is defined by the bent section and the light path adjusting element relative to the plane where the first sidewall lies;
   wherein the light path adjusting element comprises a compound lens, and no opening is arranged in the light adjusting element.

2. The optical chamber according to claim 1, wherein a diffuse reflection structure is on inner surfaces of the plurality of sidewalls and the bent section.

3. The optical chamber according to claim 1, wherein the compound lens with a refractive index ranging from 1.41 to 1.8.

4. The optical chamber according to claim 1, wherein the plurality of sidewalls further comprises a second sidewall and a third sidewall opposite to each other, wherein:
   the first sidewall abuts respectively onto the second sidewall and the third sidewall; and
   the second sidewall comprises a body section and an extension section, wherein the extension section and the body section are respectively on two sides of the plane where the first sidewall lies.

5. The optical chamber according to claim 4, wherein the first sidewall is provided with one opening; a protruding block is on a side of the opening away from the second sidewall, and the protruding block is connected with the first sidewall and faces the extension section.

6. An optical system, comprising:
the optical chamber according to claim 1; and
a light source inside the optical chamber.

7. The optical system according to claim 6, wherein the light source is on an inner surface of any one of the other sidewalls among the plurality of sidewalls than the first sidewall.

8. A display device, comprising:
a display module; and
the optical system according to claim 6, wherein the optical system is on at least one side surface of the display module, and configured to enable the emitted light to be irradiated onto a light incidence surface of the display module.

9. The display device according to claim 8, wherein the display module comprises a light-guiding plate and a display panel, wherein:
the display panel is a reflective display pane; and
the light-guiding plate is on a display surface side of the display panel.

10. The display device according to claim 9, wherein an extension section of the optical system adheres to a surface of the light-guiding plate away from the display surface side, and the light path adjusting element of the optical system is configured to face a side surface of the light-guiding plate.

11. The display device according to claim 9, wherein a protruding block of the optical system adheres to a surface of the light-guiding plate away from the display surface side.

12. The display device according to claim 8, wherein the display module comprises two light-guiding plates and a display panel, wherein:
the display panel is a transflective display panel;
the two light-guiding plates are respectively on a display surface side of the display panel and a side of the display panel away from the display surface side; and
the first sidewall of the optical system has two openings, wherein the light path adjusting elements, corresponding to areas of the two openings, are configured respectively to face side surfaces of the two light-guiding plates.

* * * * *